US009489790B2

(12) United States Patent
Sasaki et al.

(10) Patent No.: US 9,489,790 B2
(45) Date of Patent: Nov. 8, 2016

(54) DATA PROCESSING DEVICE AND DATA PROCESSING SYSTEM

(71) Applicant: Oki Electric Industry Co., Ltd., Tokyo (JP)

(72) Inventors: Akihiro Sasaki, Tokyo (JP); Youichi Norota, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 14/409,295

(22) PCT Filed: Jun. 14, 2013

(86) PCT No.: PCT/JP2013/066517
§ 371 (c)(1),
(2) Date: Dec. 18, 2014

(87) PCT Pub. No.: WO2014/010368
PCT Pub. Date: Jan. 16, 2014

(65) Prior Publication Data
US 2015/0170454 A1    Jun. 18, 2015

(30) Foreign Application Priority Data
Jul. 10, 2012  (JP) ................. 2012-154391

(51) Int. Cl.
G06K 9/00 (2006.01)
G07D 11/00 (2006.01)
G07D 7/00 (2016.01)
G07F 19/00 (2006.01)
G06Q 40/00 (2012.01)

(52) U.S. Cl.
CPC ........... *G07D 11/0066* (2013.01); *G06Q 40/00* (2013.01); *G07D 7/0006* (2013.01); *G07F 19/20* (2013.01); *G07F 19/211* (2013.01)

(58) Field of Classification Search
CPC ............ G07D 11/0066; G07D 7/0006; G07F 19/211; G07F 19/20; G06Q 40/00
USPC ........................................... 382/135
See application file for complete search history.

(56) References Cited

U.S. PATENT DOCUMENTS

2013/0001040 A1*  1/2013  Iwamura ............ G07D 11/0066
                                                       194/206

FOREIGN PATENT DOCUMENTS

| JP | 08-320966 A | 12/1996 |
| JP | 09-161134 A | 6/1997 |
| JP | 2002-342810 A | 11/2002 |
| JP | 2003-030746 A | 1/2003 |
| JP | 2010-049373 A | 3/2010 |

* cited by examiner

Primary Examiner — Tom Y Lu
(74) Attorney, Agent, or Firm — Rabin & Berdo, P.C.

(57) ABSTRACT

A data processing device is provided between a cash processing terminal cluster in a local network and an external network outside the local network. The data processing device includes a data acquisition section that acquires, in the local network, serial numbers obtained from banknotes read by a cash processing terminal configuring the cash processing terminal cluster, and results of recognition of the banknotes by the cash processing terminal; a storage controller that associates the serial numbers and the recognition results with each other and stores the serial numbers and the recognition results in a storage section; and a comparison section that, in cases in which the serial numbers and banknote recognition results have been acquired from any cash processing terminal configuring the cash processing terminal cluster, compares the banknote recognition results against the stored recognition results associated with the serial numbers.

8 Claims, 14 Drawing Sheets

FIG.5

History 1

| No | Serial Number | Transaction data | | | | | | | |
|---|---|---|---|---|---|---|---|---|---|
| | | Start | | Finish | | Transaction | Transaction agent | Status | Separated from | Stacking Destination |
| | | YYYY/MM/DD | HH/MM/SS | YYYY/MM/DD | HH/MM/SS | | | | | |
| 1 | 1234567890 | 2012/1/10 | 13:30:20 | 2012/1/10 | 13:32:25 | Withdrawal | General | Normal completion | Cassette A | Pay-in/Pay-out port |
| 2 | 1111111111 | 2012/1/10 | 18:30:20 | 2012/1/10 | 18:40:20 | Bundling | Bank worker | Normal completion | Take-in section | No. 5 stacking |
| 3 | 1212121212 | 2012/1/10 | 18:45:20 | 2012/1/10 | 18:48:57 | Deposit | Bank worker | Normal completion | Pay-in/Pay-out port | Cassette B |
| ... | ... | ... | ... | ... | ... | ... | ... | ... | ... | ... |
| n | 9999999999 | 2011/1/10 | 18:42:29 | 2011/1/10 | 18:45:20 | Deposit | Bank worker | Normal completion | Pay-in/Pay-out port | Cassette B |

History 1

| Recognition results | | | | | Other data | | | |
|---|---|---|---|---|---|---|---|---|
| Serial no. read result | Bill type data | Value | Category | Year data | Device Category | Device ID | Cassette ID | Band number |
| OK | CNY | 100 | C4b | 1999 | ATM | 12345678 | - | - |
| OK | CNY | 50 | C4b | 2005 | Banknote sorting machine | 33333333 | - | 199 |
| OK | CNY | 100 | C4b | 2002 | ATM | 13456789 | 1111111111111110 | - |
| ... | ... | ... | ... | ... | ... | ... | ... | ... |
| OK | CNY | 100 | C4a | 2002 | ATM | 13456789 | 1111111111111110 | - |

FIG.6

History 2

| Transaction data | | | | | | | | |
|---|---|---|---|---|---|---|---|---|
| Start | | Finish | | Transaction | Transaction agent | Status | Separated from | Stacking Destination |
| YYYY/MM/DD | HH/MM/SS | YYYY/MM/DD | HH/MM/SS | | | | | |
| 2012/1/10 | 9:30:20 | 2012/1/10 | 9:32:25 | Deposit | General | Normal completion | Pay-in/Pay-out port | Cassette A |
| 2012/1/10 | 15:30:20 | 2012/1/10 | 15:40:20 | Withdrawal | Bank worker | Normal completion | Take-in section | OP1 |
| 2012/1/10 | 12:30:20 | 2012/1/10 | 18:48:57 | Withdrawal | Bank worker | Normal completion | Take-in section | OP1 |
| ... | ... | ... | ... | ... | ... | ... | ... | ... |
| 2011/1/10 | 12:30:20 | 2011/1/10 | 18:45:20 | Withdrawal | Bank worker | Normal completion | Take-in section | OP1 |

History 2

| Recognition results | | | | | Other data | | | |
|---|---|---|---|---|---|---|---|---|
| Serial no. read result | Bill type data | Value | Category | Year data | Device Category | Device ID | Cassette ID | Band number |
| OK | CNY | 100 | C4b | 1999 | ATM | 12345678 | 12345678901234650 | – |
| OK | CNY | 50 | C4b | 2005 | Balance check cash recycler | 98765432 | 11223344556677780 | – |
| OK | CNY | 50 | C4b | 2005 | Balance check cash recycler | 98765432 | 11223344556677780 | – |
| ... | ... | ... | ... | ... | ... | ... | ... | ... |
| OK | CNY | 50 | C4a | 2005 | Balance check cash | 98765432 | 11223344556677780 | – |

FIG.7

History n (16 maximum)

Transaction data

| Start | | Finish | | Transaction | Transaction agent | Status | Separated from | Stacking Destination |
|---|---|---|---|---|---|---|---|---|
| YYYY/MM/DD | HH/MM/SS | YYYY/MM/DD | HH/MM/SS | | | | | |
| 2012/1/10 | 10:30:20 | 2012/1/10 | 10:31:40 | Deposit | General | Normal completion | Pay-in/Pay-out port | Cassette B |
| ... | ... | ... | ... | ... | ... | ... | ... | ... |

History n (16 maximum)

| Recognition results | | | | | Other data | | | |
|---|---|---|---|---|---|---|---|---|
| Serial no. read result | Bill type data | Value | Category | Year data | Device Category | Device ID | Cassette ID | Band number |
| OK | CNY | 50 | C4b | 2005 | TCR | 23456789 | 1122334455667780 | – |
| ... | ... | ... | ... | ... | ... | ... | ... | – |
| ... | ... | ... | ... | ... | ... | ... | ... | – |
| ... | ... | ... | ... | ... | ... | ... | ... | ... |

FIG.9

FINANCIAL ADMINISTRATION SYSTEM CASH MANAGEMENT DATA

| Denomination | Number of notes | Value |
|---:|---:|---:|
| 1,000 | 10,000 | 10,000,000 |
| 5,000 | 1,000 | 5,000,000 |
| 10,000 | 3,000 | 30,000,000 |
| Total | | ¥45,000,000 |

FIG.10
DEVICE-SPECIFIC CASH MANAGEMENT DATA

| Category | Device ID | Cassette ID | Denomination | Number of Notes | Value |
|---|---|---|---|---|---|
| ATM | 000001 | 000001 | 1,000 | 100 | 100,000 |
| | | 000002 | 1,000 | 5 | 5,000 |
| | | 000003 | 5,000 | 10 | 50,000 |
| | | 000004 | 10,000 | 300 | 3,000,000 |
| | | 000005 | 10,000 | 200 | 2,000,000 |
| ATM | 000029 | 000006 | 1,000 | 250 | 250,000 |
| | | 000007 | 1,000 | 300 | 300,000 |
| | | 000008 | 5,000 | 50 | 250,000 |
| | | 000008 | 10,000 | 100 | 1,000,000 |
| | | 000010 | 10,000 | 0 | 0 |
| ATM | 000322 | 000011 | 1,000 | 45 | 45,000 |
| | | 000012 | 1,000 | 15 | 15,000 |
| | | 000013 | 5,000 | 32 | 160,000 |
| | | 000014 | 10,000 | 18 | 180,000 |
| | | 000015 | 10,000 | 125 | 1,250,000 |
| TCR1 | 000308 | 001001 | 1,000 | 30 | 30,000 |
| | | 001002 | 1,000 | 45 | 45,000 |
| | | 001122 | 5,000 | 120 | 600,000 |
| | | 022133 | 10,000 | 18 | 180,000 |
| | | 200010 | 10,000 | 23 | 230,000 |
| ⋮ | ⋮ | ⋮ | ⋮ | ⋮ | ⋮ |
| TCR2 | 012333 | 002220 | 1,000 | 100 | 100,000 |
| | | 002001 | 1,000 | 250 | 250,000 |
| | | 003100 | 10,000 | 230 | 2,300,000 |
| | | 002005 | 10,000 | 300 | 3,000,000 |
| | | 004002 | 10,000 | 400 | 4,000,000 |
| | | Total | | | ¥45,000,000 |

FIG.14

| No. | Serial No. | Comparison Result | Recognition results | | | | Database | | | |
|---|---|---|---|---|---|---|---|---|---|---|
| | | | Sequence | Denomination | Bill type data | Cassette ID | Sequence | Denomination | Bill type data | Cassette ID |
| 1 | 12345667788 | Match | 1 | 100 | Normal | 111111 | 1 | 100 | Normal | 111111 |
| 2 | 41233327788 | Match | 2 | 100 | Normal | 111111 | 2 | 100 | Normal | 111111 |
| 3 | 29384757993 | Match | 3 | 100 | Normal | 111111 | 3 | 100 | Normal | 111111 |
| 4 | 11299947600 | Disparity | 4 | 100 | Damaged | 111111 | 4 | 100 | Normal | 111111 |
| 5 | 84847374664 | Match | 5 | 100 | Normal | 111111 | 5 | 100 | Normal | 111111 |
| ... | ... | ... | ... | ... | ... | ... | ... | ... | ... | ... |
| 2301 | 32984784757 | Match | 2301 | 100 | Normal | 111111 | 2301 | 100 | Normal | 111111 |

DATA PROCESSING DEVICE AND DATA PROCESSING SYSTEM

TECHNICAL FIELD

This application claims priority from Japanese Patent application No. 2012-154391 filed on Jul. 10, 2012, the disclosure of which is incorporated herein by reference in its entirety.

The present invention relates to a data processing device and a data processing system.

BACKGROUND ART

Generally, cash processing terminals that handle banknotes are installed in financial institutions such as banks. Examples of cash processing terminals include an Automatic Teller Machine (ATM), a Teller Cash Recycler (TCR), a balance check cash recycler, and a banknote sorting machine. These cash processing terminals are connected to a local network (refer, for example, to Japanese Patent Application Laid-Open (JP-A) No. 2010-049373). An ATM controller, a teller terminal, a balance check terminal, a banknote sorting terminal, and the like, corresponding to high-level terminals for the respective cash processing terminals, are also connected to the local network.

Sequential numbers (hereafter referred to as "serial numbers") are printed on banknotes for each type of banknote, and the cash processing terminals include functionality to read the serial numbers printed on banknotes. Serial numbers read by the ATM may be accumulated in the ATM controller. Similarly, serial numbers read by the teller cash recycler may be accumulated in the teller terminal, serial numbers read by the balance check cash recycler may be accumulated in the balance check terminal, and serial numbers read by the banknote sorting machine may be accumulated by the banknote sorting machine terminal.

SUMMARY OF INVENTION

Technical Problem

However, the serial numbers read by the cash processing terminals in such a system are only accumulated in the individual cash processing terminals, or the high-level terminals thereof (the ATM controller, the teller terminal, the balance check terminal, the banknote sorting terminal, or the like, in the example described above). The serial numbers read by the cash processing terminals are therefore not centrally managed, and search and analysis of the serial numbers cannot be easily performed.

Moreover, supposing a case in which serial numbers are managed centrally in such a system, the cash processing terminals would need to transmit the serial numbers to a financial administration system through a core network external to the local network, and the serial numbers are centrally managed in the financial administration system. However, since the financial administration system is a location where data is strictly controlled by the bank, the financial administration system cannot be easily accessed to perform search or analysis of serial numbers, due to considerations of security and communication volumes.

Moreover, it is not possible to use serial numbers to manage the balance of banknotes present at a bank branch (such as the balance of banknotes present in a cash processing terminal in the local network in the above example).

In consideration of the above circumstances, the present invention provides technology that enables search and analysis of serial numbers read by cash processing terminals to be easily performed, and that enables serial numbers to be used to manage the balance of banknotes present at a bank branch.

Solution to Problem

One aspect of the present invention provides a data processing device provided between a cash processing terminal cluster in a local network and an external network outside the local network, the data processing device including: a data acquisition section that acquires, in the local network, serial numbers obtained from banknotes read by a cash processing terminal configuring the cash processing terminal cluster, and results of recognition of the banknotes by the cash processing terminal; a storage controller that associates the serial numbers and the recognition results with each other and stores the serial numbers and the recognition results in a storage section; and a comparison section that, in cases in which the serial numbers and banknote recognition results have been acquired from any cash processing terminal configuring the cash processing terminal cluster, compares the banknote recognition results against the stored recognition results associated with the serial numbers.

The data processing device may further include a display controller that effects control so as to display the serial numbers in cases in which a result of comparison by the comparison section indicates a disparity in the recognition results.

The data processing device may further include a serial number notification section that, in cases in which a result of comparison by the comparison section indicates a disparity in the recognition results, provides notification of the serial numbers to any cash processing terminal configuring the cash processing terminal cluster, or to a cash processing terminal in a local network that is different from the local network.

The recognition result may include any of a denomination of the banknote, a banknote stacking sequence, or a number of banknotes by denomination.

One aspect of the present invention provides a data processing system including: a cash processing terminal configuring a cash processing terminal cluster in a local network, and including a data notification section that provides notification of serial numbers obtained by reading banknotes, and of recognition results of the banknotes; and a data processing device provided between the cash processing terminal and an external network outside the local network, the data processing device including: a data acquisition section that acquires, in the local network, the serial numbers and the recognition results regarding which the cash processing terminal has provided notification, a storage controller that associates the serial numbers and the recognition results with each other and stores the serial numbers and the recognition results in a storage section, and a comparison section that, in cases in which the serial numbers and banknote recognition results have been acquired from any cash processing terminal configuring the cash processing terminal cluster, compares the banknote recognition results against the stored recognition results associated with the serial numbers.

The data processing device may further include a display controller that effects control so as to display the serial numbers in cases in which a result of comparison by the comparison section indicates a disparity in the recognition results.

The data processing device may further include a serial number notification section that, in cases in which a result of comparison by the comparison section indicates a disparity in the recognition results, provides notification of the serial numbers to any cash processing terminal configuring the cash processing terminal cluster, or to a cash processing terminal in a local network that is different from the local network.

The recognition result may include any of a denomination of the banknote, a banknote stacking sequence, or a number of banknotes by denomination.

Effects of Invention

According to the above aspects, search and analysis of serial numbers read by cash processing terminals can be easily performed. Moreover, serial numbers can be used to manage the balance of banknotes present at a bank branch.

BRIEF DESCRIPTION OF DRAWINGS

FIG. 5 is a table illustrating a configuration example of accumulated data accumulated in a data processing device.

FIG. 6 is a table illustrating a configuration example of accumulated data accumulated in a data processing device.

FIG. 7 is a table illustrating a configuration example of accumulated data accumulated in a data processing device.

FIG. 9 is a table illustrating a configuration example of financial administration system cash management data.

FIG. 10 is a table illustrating a configuration of device-specific cash management data.

FIG. 14 is a table illustrating an example of comparison results in a data processing device.

DESCRIPTION OF EMBODIMENTS

Figure 1:
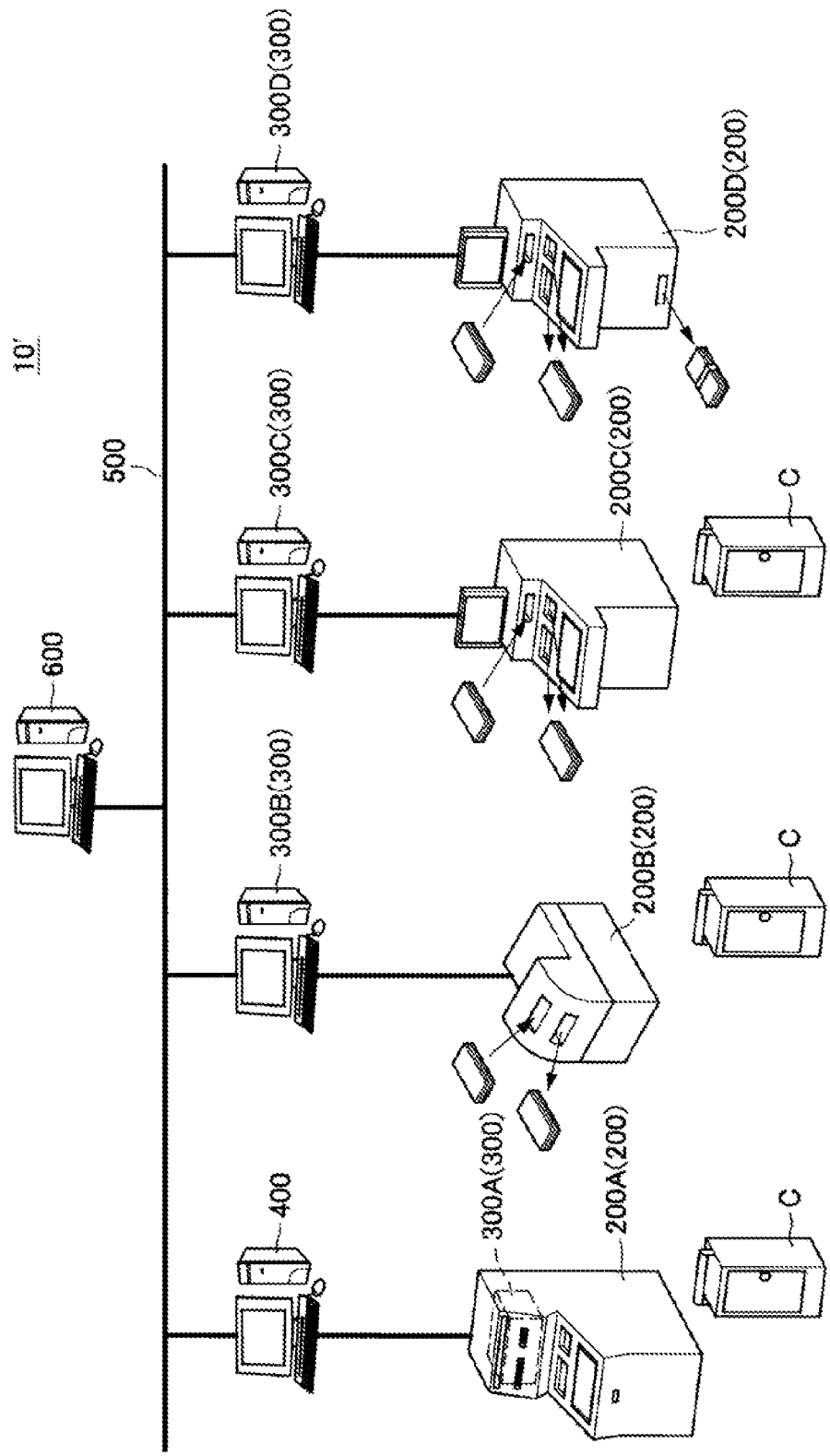
FIG. 1 is a drawing illustrating a configuration of a general data processing system.

Detailed explanation follows regarding an exemplary embodiment, with reference to the attached drawings. Note that in the present specification and in the drawings, components with substantially the same functional configuration are appended with the same reference numerals, and redundant explanation thereof is omitted.

Moreover, in the present specification and in the drawings, plural components with substantially the same functional configuration are may be distinguished by appending different letters of the alphabet after the same reference numeral. However, the same reference numeral is appended in cases in which there is no particular need to distinguish between each of plural components with substantially the same functional configuration.

Explanation of General Technology

Explanation first follows regarding a configuration of a general data processing system 10'. FIG. 1 illustrates the configuration of the general data processing system 10'. As illustrated in FIG. 1, the general data processing system 10' is provided with cash processing terminals 200 that handle banknotes, high-level terminals 300 that correspond to higher level terminals than the cash processing terminals 200, an ATM monitoring device 400, and a financial administration system 600.

As described above, the cash processing terminals 200 and the high-level terminals 300 are in a local network (namely, the cash processing terminals 200 and the high-level terminals 300 are connected to the local network). The local network is configured by a Local Area Network (LAN), for example. A core network 500 is an external network outside the local network, and is configured by a Wide Area Network (WAN), for example. The financial administration system 600 is connected to the core network 500.

The cash processing terminals 200 are installed in a financial institution such as a bank. Examples of the cash processing terminals 200 include an ATM 200A, a teller cash recycler 200B, a balance check cash recycler 200C, and a banknote sorting machine 200D. Examples of the high-level terminals 300 include an ATM controller 300A, a teller terminal 300B, a balance check terminal 300C, and a banknote sorting machine terminal 300D.

The ATM 200A is a terminal for customers to withdraw or deposit banknotes, and operates mounted with a cassette C for storing banknotes. The ATM 200A includes the ATM controller 300A, and is connected to the ATM monitoring device 400. Although a single ATM 200A is connected to the ATM monitoring device 400 in the example illustrated in FIG. 1, plural ATMs 200A may be connected thereto. The ATM 200A is, for example, installed in a branch of a financial institution. The ATM monitoring device 400 is generally connected to the financial administration system 600 through the core network 500.

The teller cash recycler 200B is a terminal that pays in banknotes received from a customer, or pays out banknotes at the customer's request, based on operation of the teller terminal 300B by a bank worker. The teller cash recycler 200B is installed at a service counter of the financial institution, for example. Similarly to the ATM 200A, the teller cash recycler 200B operates mounted with a cassette C for storing banknotes. The teller terminal 300B is generally connected to the financial administration system 600 through the core network 500.

The balance check cash recycler 200C includes functionality to count money retrieved from the ATM 200A or the teller cash recycler 200B, and compute the cash balance based on operation of the balance check terminal 300C by a bank worker. The balance check cash recycler 200C is installed behind a service counter or in a back office of a bank, for example. Similarly to the ATM 200A, the balance check cash recycler 200C operates mounted with a cassette C for storing banknotes. The balance check terminal 300C is generally connected to the financial administration system 600 through the core network 500.

The banknote sorting machine 200D includes functionality to count and sort money retrieved from the ATM 200A or the teller cash recycler 200B, and to apply a currency band to every specific number of notes (every 100 notes, for example), based on operation of the banknote sorting machine terminal 300D by a bank worker. Every specific number of notes, the banknote sorting machine 200D prints a band number on a currency band bundling banknotes, and outputs the bundle. The banknote sorting machine 200D can store the printed band numbers in date, hour, minute and second units. The banknote sorting machine 200D is installed behind the service counter, or in the back office of a bank, for example. The banknote sorting machine 200D does not include a cassette C for storing banknotes. The banknote sorting machine terminal 300D is generally connected to the financial administration system 600.

The respective cassettes C used in the ATM 200A, the teller cash recycler 200B, and the balance check cash recycler 200C are generally interchangeable with each other. The cassettes C each have their own unique ID (hereafter also referred to as "cassette ID"), and the cassette ID is stored in internal memory of the cassette C. When mounted to a cash processing terminal 200, the cassette ID is read by the cash processing terminal 200.

Each of the cash processing terminals 200 has a unique ID (hereafter also referred to as "device ID"), and the device ID stored is in internal memory of each of the cash processing terminals 200. As described above, banknotes are printed with serial numbers, and the cash processing terminals 200 include functionality to read the serial numbers printed on banknotes. The serial numbers read by the ATM 200A may be accumulated by the ATM controller 300A. Similarly, the serial numbers read by the teller cash recycler 200B may be accumulated by the teller terminal 300B, the serial numbers read by the balance check cash recycler 200C may be accumulated by the balance check terminal 300C, and the serial numbers read by the banknote sorting machine 200D may be accumulated by the banknote sorting machine terminal 300D.

However, in the data processing system 10', the serial numbers read by the cash processing terminals 200 are only accumulated in the cash processing terminals 200, or the high-level terminals thereof (the ATM controller 300A, the teller terminal 300B, the balance check terminal 300C, the banknote sorting machine terminal 300D, or the like in the above-described example). Consequently, the serial numbers read by the cash processing terminals 200 are not centrally managed, and search and analysis of the serial numbers cannot be easily performed.

Suppose central management of the serial numbers in the data processing system 10' is to be performed, the cash processing terminals 200 would need to transmit the serial numbers to the financial administration system 600 via the core network 500 outside the local network, and central management of the serial numbers is performed by the financial administration system 600. However, the financial administration system 600 is a location where data is strictly controlled by the bank, and, due to considerations of security and communication volumes, the financial administration system 600 cannot be easily accessed for search or analysis of serial numbers.

The exemplary embodiment therefore proposes technology in which search and analysis of serial numbers read by the cash processing terminals 200 can be easily performed.

Explanation of Exemplary Embodiment

Figure 2:
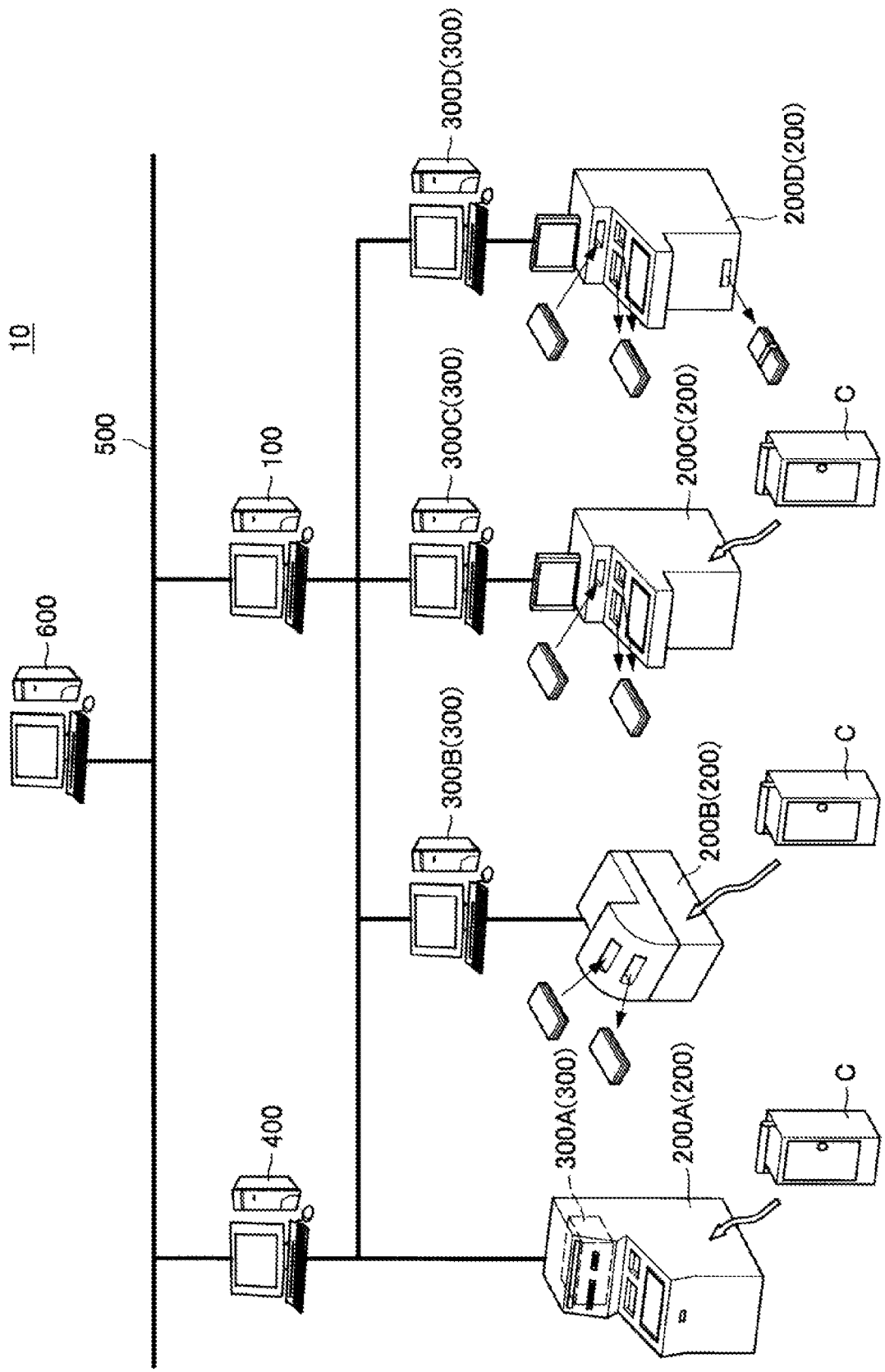
FIG. 2 is a drawing illustrating a configuration of a data processing system according to an exemplary embodiment.

Explanation follows regarding configuration of a data processing system 10 according to the exemplary embodiment. FIG. 2 illustrates the configuration of the data processing system 10 according to the exemplary embodiment. As illustrated in FIG. 2, the data processing system 10 principally differs from the general data processing system 10' in that a data processing device 100 is provided. In particular, the data processing device 100 is provided between the core network 500 and one or plural cash processing terminals 200 (hereafter referred to as a "cash processing terminal cluster") in the local network.

In the local network, the data processing device 100 acquires serial numbers obtained from banknotes read by the cash processing terminals 200 configuring the cash processing terminal cluster, and stores the serial numbers. In such a configuration, search and analysis of the serial numbers can be easily performed, since the serial numbers read by the cash processing terminals 200 are centrally managed.

Moreover, the serial numbers are managed by the data processing device 100, that differs from the financial administration system 600 where data is strictly controlled by the bank. Access restrictions due to considerations of security and communication volumes are therefore more relaxed than cases in which serial numbers are managed by the financial administration system 600. The data processing device 100 can therefore be easily accessed to perform search and analysis of serial numbers.

Note that the data processing device 100 may be provided as an independent device as illustrated in FIG. 2, or may be integrated with another device. For example, the data processing device 100 may be provided between the cash processing terminal cluster in the local network and the core network 500 in an integrated state with at least one of the balance check terminal 300C or the banknote sorting machine terminal 300D.

There is no particular limit to the number of cash processing terminals 200. Moreover, although the ATM 200A, the teller cash recycler 200B, the balance check cash recycler 200C, and the banknote sorting machine 200D are illustrated as examples of cash processing terminals 200 in the example illustrated in FIG. 2, there is no particular limitation to the type of the cash processing terminals 200. It is therefore sufficient that at least one of the ATM 200A, the teller cash recycler 200B, the balance check cash recycler 200C, or the banknote sorting machine 200D is included in the cash processing terminal(s) 200 configuring the cash processing terminal cluster.

The configuration of the data processing system 10 according to the exemplary embodiment has been explained above. Explanation follows regarding an example of functional configuration of the cash processing terminal 200 according to the exemplary embodiment.

Explanation of Configuration

Figure 3:
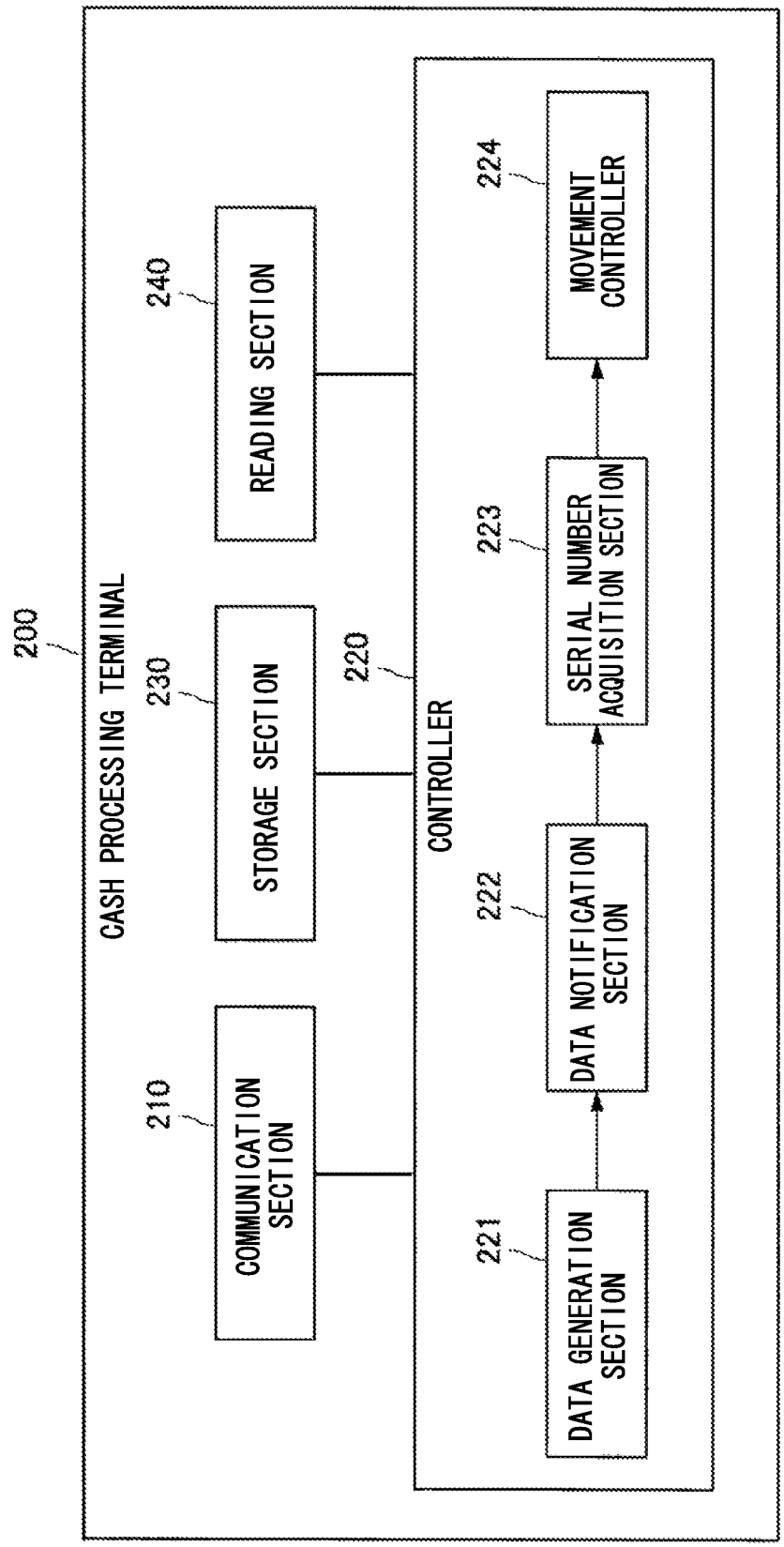
FIG. 3 is a drawing illustrating a functional configuration example of a cash processing terminal according to an exemplary embodiment.

FIG. 3 illustrates an example of the functional configuration of the cash processing terminal 200 according to the exemplary embodiment. As illustrated in FIG. 3, the cash processing terminal 200 according to the exemplary embodiment includes a communication section 210, a controller 220, a storage section 230, and a reading section 240.

The communication section 210 includes functionality to communicate with other devices, under control of the controller 220. The controller 220 includes functionality to control overall operation of the cash processing terminal 200. The storage section 230 may store programs or data for operation of the controller 220. The storage section 230 may also temporarily store various data required in operational procedures of the controller 220. The reading section 240 includes functionality to read banknotes handled in a transaction.

Note that, although the communication section 210, the storage section 230, and the reading section 240 are provided inside the cash processing terminal 200 in the example illustrated in FIG. 3, the communication section 210, the storage section 230, and the reading section 240 may be externally provided to the cash processing terminal 200. The controller 220 is provided with a data generation section 221, a data notification section 222, a serial number acquisition section 223, and a movement controller 224. Detailed explanation follows regarding each of these functional sections provided to the controller 220.

The data generation section 221 includes functionality to generate data relating to banknotes handled in transactions by the cash processing terminal 200 (hereafter also referred to as "banknote data"). The banknote data referred to herein includes at least the serial numbers of the banknotes, and may also include transaction data, recognition results, and other data. For example, the data generation section 221 may recognize serial numbers from read data read by the reading section 240. The data generation section 221 may employ partial serial number data from the read data of banknotes in place of the serial number, in cases in which the serial number cannot be recognized correctly from the read data.

The data generation section 221 may, for example, also recognize recognition results from the read data read by the reading section 240. The data generation section 221 can also acquire transaction data and other data from a specific location.

The data notification section 222 includes functionality to notify the data processing device 100 of banknote data generated by the data generation section 221. The data notification section 222 also includes functionality to notify the financial administration system 600 of banknote data generated by the data generation section 221. When notifying the financial administration system 600 of banknote data, the communication section 210 transmits banknote data to the financial administration system 600 through the core network 500.

The serial number acquisition section 223 acquires a serial number from the data processing device 100. If, for example, the serial number acquisition section 223 is notified of a serial number by the data processing device 100, the serial number acquisition section 223 can acquire the serial number notified by the data processing device 100. A serial number of any type of banknotes may be notified from the data processing device 100. For example, the serial number notified from the data processing device 100 may be the serial number of a lost banknote.

The movement controller 224 controls such that a banknote printed with the serial number acquired by the serial number acquisition section 223 is moved to a specific location. A banknote conveyance path moves the banknote printed with this serial number to the specific location under control of the movement controller 224. The specific location is not particularly limited, and may, for example, be either a banknote reject box (RJ box), or a designated banknote storage box.

Moving a banknote to the specific location in this manner enables the banknote to be isolated. Transaction of the cash processing terminal 200 may also be stopped as a banknote is moved to the specific location. Note that a case is envisaged here in which the cash processing terminal 200 that notified the data processing device 100 of the serial number is the same as the cash processing terminal 200 acquiring the serial number from the data processing device 100, however they may be different from each other.

An example of the functional configuration of the cash processing terminal 200 according to the exemplary embodiment has been explained above. Explanation follows regarding an example of functional configuration of the data processing device 100 according to the exemplary embodiment.

Figure 4:
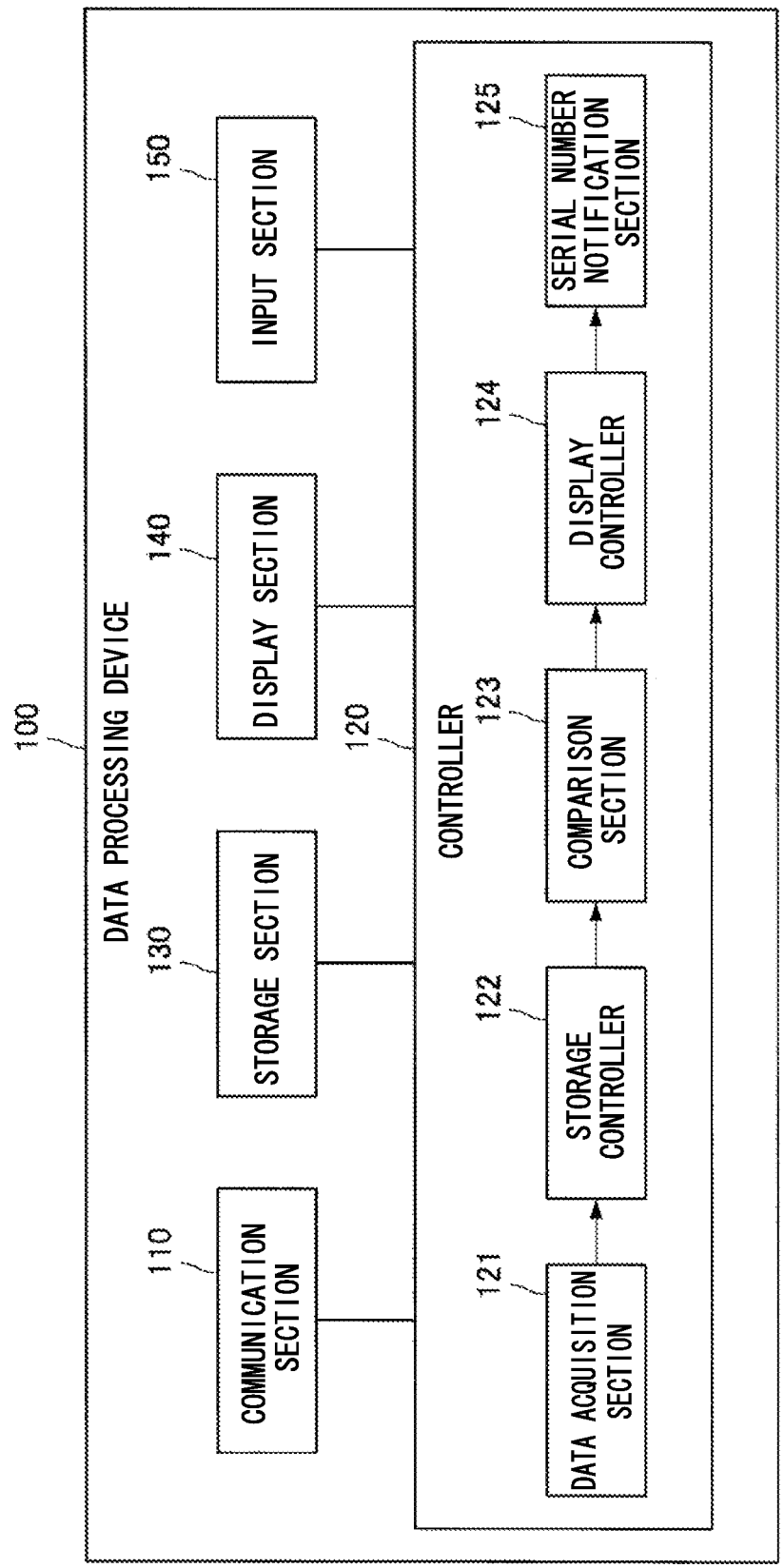
FIG. 4 is a drawing illustrating a functional configuration example of a data processing device according to an exemplary embodiment.

FIG. 4 illustrates an example of the functional configuration of the data processing device 100 according to the exemplary embodiment. As illustrated in FIG. 4, the data processing device 100 according to the exemplary embodiment includes a communication section 110, a controller 120, and a storage section 130. The data processing device 100 is further provided with a display section 140 and an input section 150.

The communication section 110 includes functionality to communicate with other devices, under control of the controller 120. The controller 120 includes functionality to control overall operation of the data processing device 100. The storage section 130 may store programs or data for operation of the controller 120. The storage section 130 may also temporarily store various data required in operational procedures of the controller 120. The display section 140 includes functionality to display information under control of the controller 120. The input section 150 includes functionality to receive data input by an operator.

Note that, although the communication section 110, the storage section 130, the display section 140 and the input section 150 are provided inside the data processing device 100 in the example illustrated in FIG. 4, the communication section 110, the storage section 130, the display section 140 and the input section 150 may be externally provided to the data processing device 100. The controller 120 is provided with a data acquisition section 121, a storage controller 122, a comparison section 123, a display controller 124, and a serial number notification section 125. Detailed explanation follows regarding each of the functional sections provided to the controller 120.

The data acquisition section 121 includes functionality to acquire the banknote data, generated by the cash processing terminals 200 configuring the cash processing terminal cluster, in the local network (namely, the data acquisition section 121 includes functionality to acquire banknote data through the local network). For example, the data acquisition section 121 acquires banknote data, notified by the data notification sections 222, in the local network.

The storage controller 122 stores the banknote data acquired by the data acquisition section 121 in the storage section 130. The banknote data includes at least serial numbers. In cases in which data other than serial numbers (for example, transaction data, recognition results, or other data) are included in the banknote data acquired by the data acquisition section 121, this data may be stored in the storage section 130 as history associated with the respective serial numbers.

By appending data other than the serial number to the history in this manner, the data other than the serial number can also be utilized in search and analysis. The transaction data may have a common format for the plural cash processing terminals 200 configuring the cash processing terminal cluster. Utilizing a common format for the transaction data in the plural cash processing terminals 200 further facilitates use of the transaction data in search and analysis, compared to cases utilizing transaction data with formats that differ according to the cash processing terminal 200.

When a serial number and banknote recognitions result are acquired from any of the cash processing terminals 200 configuring the cash processing terminal cluster, the comparison section 123 compares the banknote recognition results against recognition results stored associated with the serial number. The serial number and banknote recognition results are, for example, acquired by transmission from the cash processing terminal 200 by the communication section 110. As a comparison result, the comparison section 123 is capable of outputting data indicating whether there is a match or a disparity in the recognition results.

The comparison section 123 may perform comparison one banknote at a time, or may perform comparison in units of the cassettes that hold banknotes. There is no particular limitation to the type of the recognition results. For example, the recognition results may be the denomination of banknotes stored in a cassette, may be the stacking sequence of the banknotes, or may be the number of banknotes stored in the cassette by denomination. The recognition results may also include any of the denomination, banknote stacking sequence, or number of banknotes stored in a cassette by denomination.

The display controller 124 effects control to display various information. The display controller 124 may effect control to display menu screens and the like, described later. The display controller 124 may also effect control to display comparison results of the comparison section 123. For example, the display controller 124 may effect control to display the serial number when the comparison result by the comparison section 123 indicates a disparity in the recognition results. The display section 140 performs display under the control of the display controller 124.

The serial number notification section 125 notifies the serial number to any of the cash processing terminals 200 configuring the cash processing terminal cluster, or to a cash processing terminal 200 in a different local network (hereafter referred to as the "second local network") to the local network (hereafter referred to as the "first local network") mentioned above, if the comparison results of the comparison section 123 indicate a disparity in the recognition results. The serial number notification section 125 may notify the serial number to all of the cash processing terminals, or to some of the cash processing terminals, of the cash processing terminal cluster in the first local network, and the cash processing terminal cluster in the second local network.

A case is envisaged, for example, in which the second local network is at a different bank branch to the bank branch with the first local network, and is connected to the core network 500. The serial number notification section 125 may, for example, notify a serial number to selected cash processing terminal(s) of the cash processing terminal cluster in the first local network and the cash processing terminal cluster in the second local network. Selection of the cash processing terminals is, for example, performed by the serial number notification section 125 based on operation of the input section 150 by an operator.

An example of the functional configuration of the data processing device 100 according to the exemplary embodiment has been explained above. Explanation follows regarding an example of configuration of accumulated data accumulated in the data processing device 100 according to the exemplary embodiment.

FIG. 5 to FIG. 7 illustrate an example of the configuration of accumulated data accumulated in the data processing device 100 according to the exemplary embodiment. As illustrated in FIG. 5 to FIG. 7, the accumulated data is configured with histories 1 to n (for example, n≤16) associated with each serial number. Namely, when serial numbers and histories have been acquired from the cash processing terminals 200, the data processing device 100 stores the history associated with the corresponding serial number. Each history includes, for example, "transaction data", "recognition results", and "other data".

The "transaction data" includes "start", "finish", "transaction", "transaction agent", "status", "separated from", and "stacking destination". The "start" indicates the date and time a transaction has started by the cash processing terminal 200, and "finish" indicates the date and time the transaction has finished by the cash processing terminal 200. The "transaction" data indicates the type of transaction performed by the cash processing terminal 200, examples of transactions including deposits, withdrawals, bundling, counting, and so on.

The "transaction agent" is data indicating a person performing the transaction. For example, the transaction agent is a customer when deposit or withdrawal transactions are performed by the ATM 200A or the teller cash recycler 200B, the transaction agent is a bank worker when a counting transaction is performed by the teller cash recycler 200B, and the transaction agent is a bank worker when a transaction is performed by the balance check cash recycler 200C or the banknote sorting machine 200D.

The "status" is data indicating whether or not a transaction completed correctly. Examples of the status include normal completion and completion error. The "stacking destination" is data indicating the banknote storage location inside the cash processing terminal 200. Examples of stacking destinations include a cassette, a pay-in/pay-out port, a temporary storage section, a stacking box, and an RJ box. In particular, the RJ box serves as the stacking destination for storing the banknote when an abnormal banknote is discovered.

The "recognition results" include "serial number read result", "bill type data", "value", "category" and "year data". The "serial number read result" indicates whether or not a serial number could be read correctly. Data of a portion corresponding to the serial number in read data of the banknote may be accumulated instead of the serial number if the serial number cannot be recognized correctly. The "bill type data" is data indicating the area (the country, for example) where the banknote was issued. Examples of bill type data include the American currency unit (US dollar), Chinese currency unit (Chinese yuan), and Japanese currency unit (Japanese yen). The "value" is data indicating the value of the banknote.

The "category" is data indicating the category of banknote, and is expressed, for example, by C1, C2, C3, C4a, C4b, and so on. Note that C1 is a category containing bills other than banknotes. C2 is a category containing bills that are suspected to be counterfeit bills, and C3 is a category containing bills that have a high likelihood of being counterfeit bills. C4a is a category containing bills that are normal bills, and C4b is a category containing bills that are damaged bills. The "year data" is data indicating the year the banknote was issued.

The "other data" includes "device category", "device ID", "cassette ID" and "band number". The "device category" is data indicating the category of the cash processing terminal 200 on which a transaction has been performed. For example, the "device category" may be data indicating any one of an ATM, a teller cash recycler, a balance check cash recycler, or a banknote sorting machine. The "device ID" corresponds to ID for identifying the cash processing terminal 200 on which the transaction has been performed. The "cassette ID" corresponds to an ID that identifies a cassette C in which the banknote is held. The "band number"

corresponds to the band number printed on the banknote bundle bundled by the banknote sorting machine 200D.

An example of configuration of the accumulated data accumulated in the data processing device 100 according to the exemplary embodiment has been explained above. Explanation follows regarding an operational flow during operation of the data processing system 10 according to the exemplary embodiment.

Explanation of Operation

Figure 8:
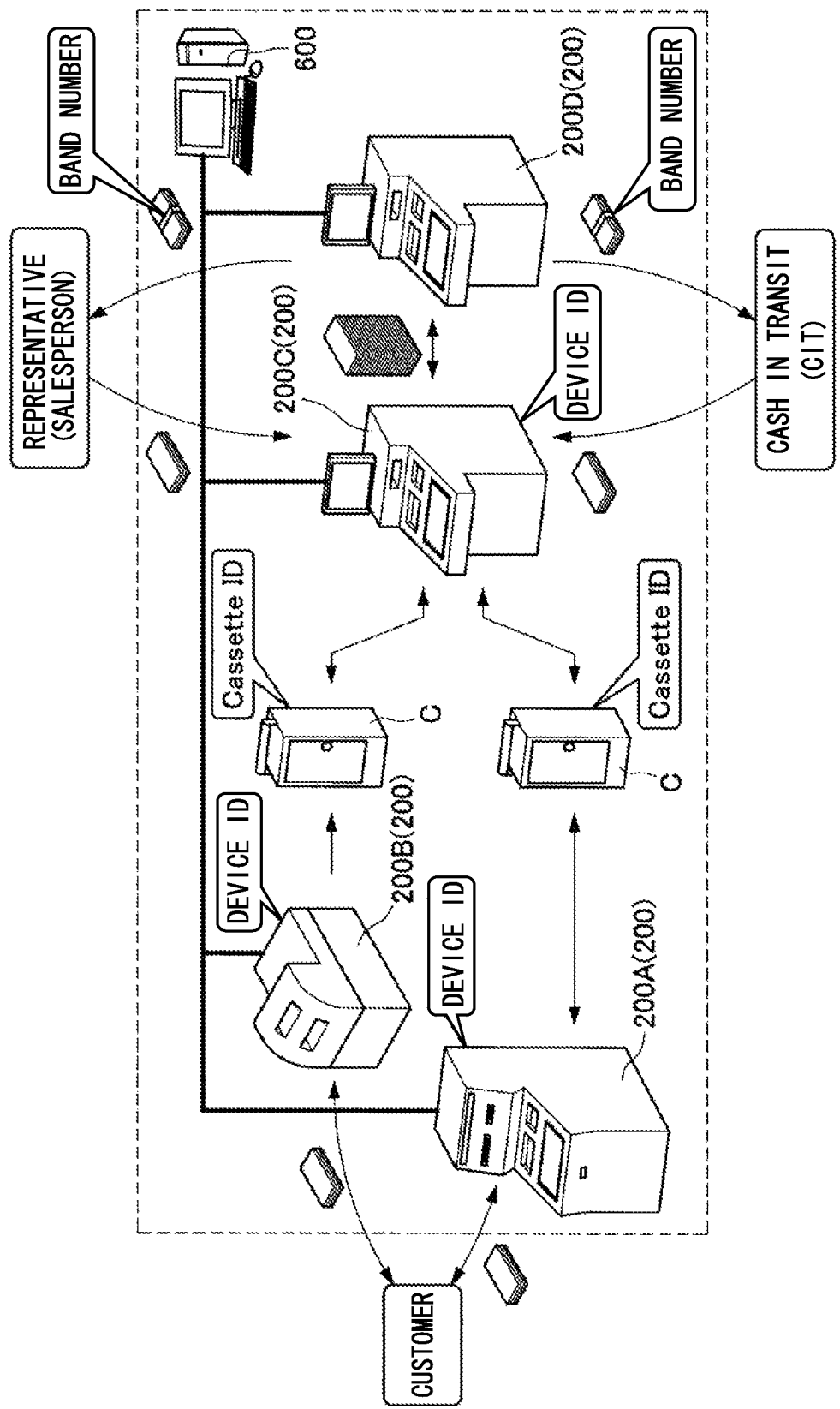
FIG. 8 is a drawing illustrating an operation example of a data processing system.

FIG. 8 illustrates an example of operation of the data processing system according to the exemplary embodiment of the invention. As illustrated in FIG. 8, firstly, customers deposit or withdraw banknotes using the ATM 200A or the teller cash recycler 200B. When cashing up at the end of operation or the like, a bank worker at the financial institution removes the cassette C from the ATM 200A or the teller cash recycler 200B, and mounts the removed cassette C in the balance check cash recycler 200C.

Next, the financial institution bank worker counts the banknotes using the balance check cash recycler 200C, and confirms the balance of the banknotes. The financial institution bank worker inserts the banknotes paid out by the balance check cash recycler 200C into the banknote sorting machine 200D.

The financial institution bank worker sorts the banknotes by denomination, and into either damaged bills or normal bills, using the banknote sorting machine 200D. Damaged bills correspond to damaged or dirty banknotes not for circulation in the market. Normal bills correspond to undamaged banknotes that present no issue to being recirculated in the market. Using the banknote sorting machine 200D, the financial institution bank worker sorts the banknotes, and, every specific number of notes (every 100 notes, for example), applies a currency band to form banknote bundles.

The banknote bundles applied with currency bands may be held in a safe on the premises, or may be transported to a cash center or another branch. Alternatively, a representative (or salesperson) may take the banknote bundles to a customer outside the branch for business purposes. Note that, depending on the operational policy of the financial institution, the banknotes may be held in the safe on the premises or transported to the cash center or the other branch, while being held in the cassette C.

A representative or company (cash transport company, i.e., Cash In Transit: CIT) transporting cash to the financial institution inserts banknotes into the balance check cash recycler 200C to be counted, and confirms the balance of the brought banknotes. The representative or company transporting the cash to the financial institution stores banknotes, of which the denomination and number of notes have been confirmed, in the cassette C as replenishment cash for the ATM 200A or the teller cash recycler 200B. The financial institution bank worker mounts the cassette C in which the banknotes are stored to the ATM 200A or the teller cash recycler 200B to start customer transactions.

In the work flow illustrated above, whenever banknotes are counted by the respective cash processing terminals 200, the serial numbers of the banknotes are read by the cash processing terminal 200, and notified to the data processing device 100 as banknote data. As illustrated in FIG. 5 to FIG. 7, the notified banknote data is compiled in a format in which the serial number and history are associated with each other, and accumulated in the storage section 130 of the data processing device 100. The data processing device 100 is thereby able to manage the history of the banknotes (how the banknotes have been handled on the premises, for example).

An operational flow of the data processing system 10 according to the exemplary embodiment has been explained above. Explanation follows regarding an example of a flow of operation of the data processing system 10 according to the exemplary embodiment.

Figure 11:
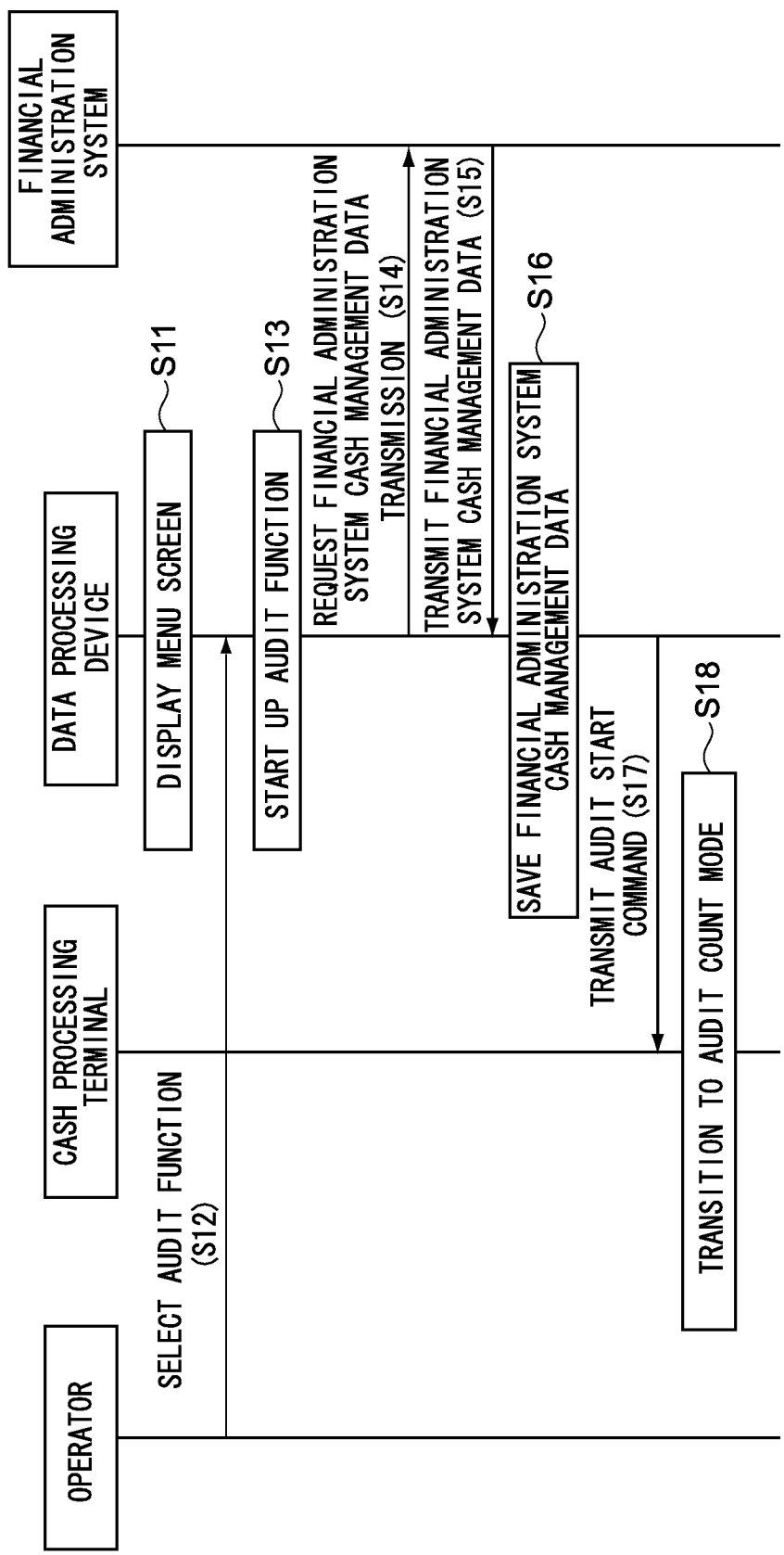
FIG. 11 is a drawing illustrating an example of operation flow in a data processing system.
Figure 12:
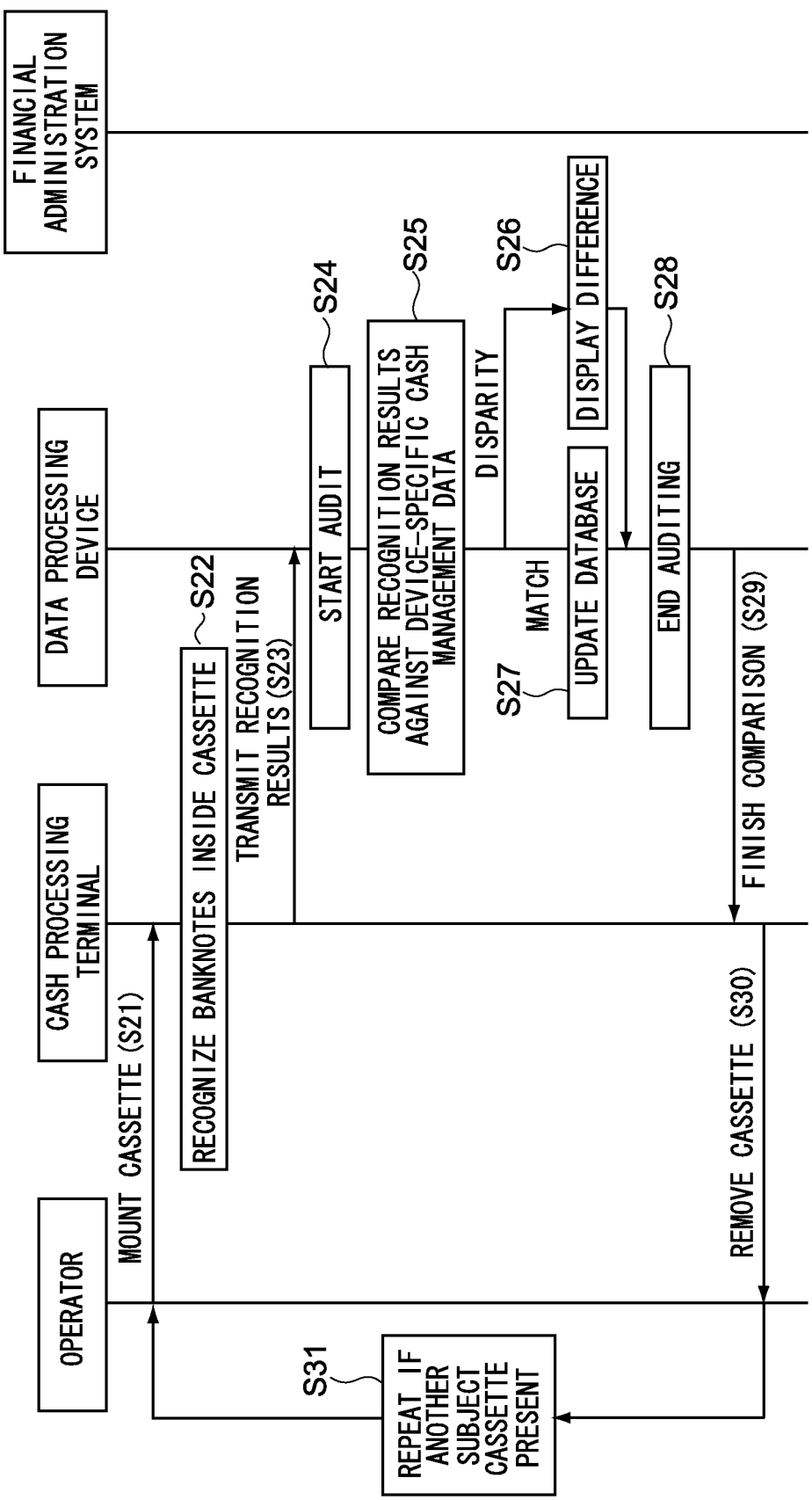
FIG. 12 is a drawing illustrating an example of operation flow in a data processing system.
Figure 13:
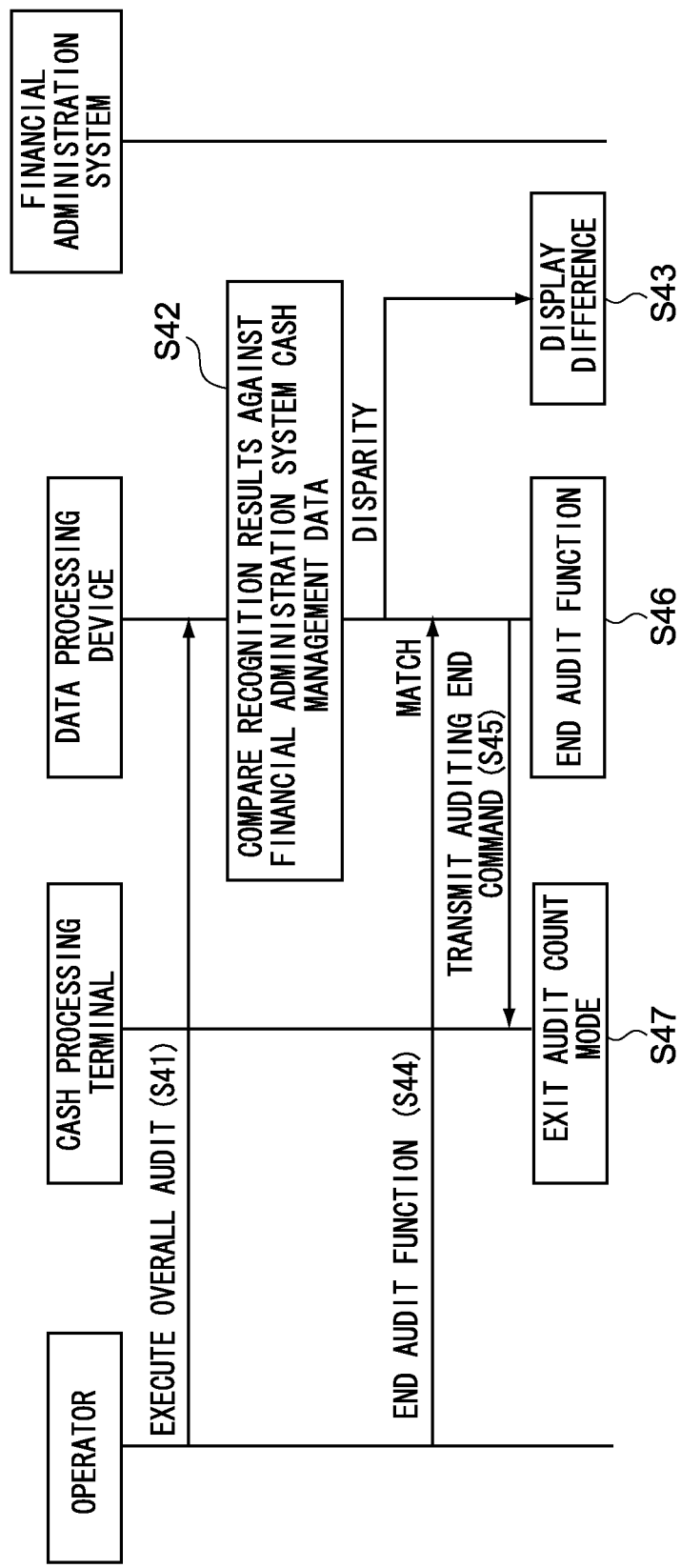
FIG. 13 is a drawing illustrating an example of operation flow in a data processing system.

FIG. 9 illustrates an example of configuration of financial administration system cash management data. FIG. 10 illustrates an example of configuration of device-specific cash management data. FIG. 11 to FIG. 13 illustrate an example of operation flow in the data processing system 10 according to the exemplary embodiment. Note that the example of operation flow illustrated in FIG. 11 to FIG. 13 are merely an example of operation flow in the data processing system 10, and the operation of the data processing system 10 is obviously not limited to the example illustrated in FIG. 11 to FIG. 13.

As illustrated in FIG. 9, the financial administration system cash management data is data managed by the financial administration system 600, and is data regarding numbers of transacted notes by denomination, managed on a day-by-day basis. The financial administration system cash management data is used to ascertain the balance of banknotes present at the bank branch. Referencing (cross-checking) the financial administration system cash management data against the real cash (the banknotes actually present at the bank branch) is generally referred to as auditing. When disparities are present in audit results, there is a need to uncover the cause of such disparities.

As illustrated in FIG. 10, the device-specific cash management data is data compiled by device based on accumulated data in the data processing device 100, and, similarly to the financial administration system cash management data, is data regarding numbers of transacted notes by denomination, managed on a day-by-day basis. The device-specific cash management data is used to ascertain the balance of banknotes present at the bank branch. In auditing, the device-specific cash management data may be referenced against the real cash (the banknotes actually present at the bank branch).

Note that in the above explanation, the recognition results stored in the storage section 130 are subject to comparison by the comparison section 123. In the explanation accompanying the examples illustrated in FIG. 11 to FIG. 13, the device-specific cash management data and the financial administration system cash management data are used as examples of such recognition results.

As illustrated in FIG. 11 to FIG. 13, first, the data processing device 100 displays a menu screen (step S11). A case is envisaged here in which the menu screen includes a button for selecting an audit function. After an operator has selected the audit function (step S12), the data processing device 100 starts up the audit function (step S13). The data processing device 100 notifies the financial administration system of a financial administration system cash management data transmission request (step S14). The financial administration system 600 transmits the financial administration system cash management data to the data processing device 100 in response to the financial administration system cash management data transmission request (step S15).

Next, after saving the financial administration system cash management data (step S16), the data processing device 100 transmits an audit start command to the cash processing terminal 200 (step S17). The cash processing terminal 200 that has received the audit start command transitions to an audit count mode (step S18). Note that the cash processing terminal 200 to which the audit start command is transmitted may be selected by the operator.

After the operator mounts a cassette to the cash processing terminal 200 (step S21), the cash processing terminal 200 recognizes the banknotes inside the cassette (step S22), and transmits recognition results to the data processing device 100 (step S23). After the data processing device 100 has received the recognition results from the cash processing terminal 200, auditing is started (step S24), and the recognition results are compared against the device-specific cash management data (step S25). Note that, since the recognition results and the device-specific cash management data are in different formats to each other, comparison may be made, for example, in a state in which the format of the recognition results has been adapted to the format of the device-specific cash management data.

If the comparison results indicate a match, the data processing device 100 updates a database (the device-specific cash management data) (step S27), and ends auditing (step S28). However, if the comparison results indicate a disparity, the data processing device 100 displays the difference (step S26), and ends auditing (step S28). FIG. 14 illustrates an example of comparison results of the data processing device. As illustrated in FIG. 14, the data processing device 100 is, for example, capable of displaying the comparison results. The "No." in FIG. 14 indicates the stacking sequence of banknotes in the cassette, with a difference between the recognition results and the device-specific cash management data evident in row "No. 4". A specific emphasized display (such as display in a specific color), for example, may highlight the locations of differences.

After the data processing device 100 has notified the cash processing terminal 200 that comparison of the recognition results of a given cassette against the device-specific cash management data has finished (step S29), the cash processing terminal 200 notifies the operator of this fact. After receipt of this notification, the operator removes the cassette from the cash processing terminal 200 (step S30), and, if other cassettes storing banknotes to be audited are present, the operation from step S21 onwards is repeated (step S31).

When no other cassettes storing banknotes to be audited remain, the operator selects execution of an overall audit (step S41). After the operator has selected execution of the overall audit, the data processing device 100 compares the recognition results against the financial administration system cash management data (step S42). Note that since the recognition results and the financial administration system cash management data are in different formats to each other, comparison may be made, for example, in a state in which the format of the recognition results has been adapted to the format of the financial administration system cash management data.

If the comparison results indicate a disparity, the data processing device 100 displays the difference (step S43), and if the comparison results indicate a match, the data processing device 100 ends the audit function (step S46). Note that after the comparison results indicate a match and the operator has selected to end the audit function (step S44), the data processing device 100 transmits an auditing end command to the cash processing terminal 200 (step S45), and after receipt of the auditing end command, the cash processing terminal 200 exits the audit count mode (step S47).

Since this operation enables referencing of the real cash against the data for each serial number, swift action is possible even when a disparity arises during auditing. For example, even in a case in which a single banknote has been lost, it is possible to confirm the serial number printed on the lost banknote, and by referring to the history on the data processing device 100 with this serial number, it is possible to confirm during which transaction(s) the loss might have occurred. The comparison subject may be varied by settings. For example, banknotes of the same denomination may be compared against each other, or more detailed comparison may be made by adding the banknote year data as an additional comparison subject.

As described above, the data processing system 10 of the exemplary embodiment principally differs from the general data processing system 10' in the provision of the data processing device 100. Specifically, the data processing device 100 is provided between the cash processing terminal cluster in the local network and the core network 500.

The data processing device 100 acquires serial numbers obtained from banknotes read by the cash processing terminals 200 configuring the cash processing terminal cluster in the local network, and stores the serial numbers. In such a configuration, the serial numbers read by the cash processing terminals 200 are centrally managed, enabling search and analysis of the serial numbers to be easily performed.

The data processing device 100 includes functionality to compare the recognition results of banknotes acquired from the cash processing terminal 200 against existing managed data (the device-specific cash management data and the financial administration system cash management data in the above example). The balance of banknotes present at the bank branch can accordingly be managed using serial numbers. The balance of these banknotes may be managed on a cassette-by-cassette basis, or may be managed on a banknote-by-banknote basis.

When a disparity arises in auditing, the data processing device 100 may, for example, display a serial number for which there is a disparity, or may notify the cash processing terminal 200. When the banknote printed with this serial number is detected in the cash processing terminal 200, the banknote may be moved to a specific location, or the data processing device 100 may be notified. The present exemplary embodiment accordingly facilitates tracking of banknotes printed with serial numbers for which there is a disparity in auditing.

Explanation of Modified Examples

Detailed explanation is given above regarding a suitable exemplary embodiment with reference to the drawings, however, the present invention is not limited to this exemplary embodiment. It would be clear to a practitioner familiar with the technical field that various modifications and adjustments may be implemented within the scope of the technical concept recited in the claims, and any such modifications and adjustments should obviously be understood to be included within the technical scope of the invention.

Each of the blocks configuring the controller 120 may, for example, be configured by a Central Processing Unit (CPU), Random Access Memory (RAM), and the like, and such functionality may be realized by the CPU loading a program stored in the storage section 130 into the RAM, and executing the program. Alternatively, each of the blocks configuring the controller 120 may be configured by dedicated hardware, or may be configured by a combination of plural hardware.

Each of the blocks configuring the controller 220 may, for example, be configured by a CPU, RAM, and the like, and functions of the blocks may be realized by the CPU loading a program stored in the storage section 230 into the RAM and executing the program. Alternatively, each of the blocks configuring the controller 220 may be configured by dedicated hardware, or may be configured by a combination of plural hardware.

In the present specification, the steps depicted in the flow charts obviously include processing performed in the time sequence matching the depicted sequence, and also include processing performed in parallel, or individually, with processing not necessarily being performed in time sequence. Obviously, the sequence of steps processed in time sequence may also be varied as appropriate.

The invention claimed is:

1. A data processing device provided between a cash processing terminal cluster in a local network and an external network outside the local network, the data processing device comprising:
   a central processing unit (CPU), comprising:
      a data acquisition section that acquires, in the local network, serial numbers obtained from banknotes read by a cash processing terminal that is part of the cash processing terminal cluster, results of recognition of the banknotes by the cash processing terminal, transaction data that indicates at least a type of transaction, and device data that identifies at least a device that performed the transaction;
      a storage controller that associates the serial numbers, the recognition results, the transaction data, and the device data with each other and stores the serial numbers, the recognition results, the transaction data, and the device data in a storage section; and
      a comparison section that, in cases in which the serial numbers and banknote recognition results have been acquired from any cash processing terminal that is part of the cash processing terminal cluster, compares the banknote recognition results against the stored recognition results associated with the serial numbers.

2. The data processing device of claim 1, wherein the display controller is configured to control a display of the serial numbers in cases in which a result of comparison by the comparison section indicates a disparity in the recognition results.

3. The data processing device of claim 1, further comprising a serial number notification section that, in cases in which a result of comparison by the comparison section indicates a disparity in the recognition results, provides a notification of the serial numbers to any cash processing terminal that is a part of the cash processing terminal cluster, or to a cash processing terminal in a local network that is different from the local network.

4. The data processing device of claim 1, wherein the recognition results include any of a denomination of the banknote, a banknote stacking sequence, or a number of banknotes by denomination.

5. A data processing system comprising:
   a cash processing terminal that is part of a cash processing terminal cluster in a local network, the cash processing terminal including a data notification section that provides notification of serial numbers obtained by reading banknotes, and of recognition results of the banknotes; and
   a data processing device provided between the cash processing terminal and an external network outside the local network, the data processing device comprising:
   a central processing unit (CPU), comprising:
      a data acquisition section that acquires, in the local network, the serial numbers, the recognition results regarding which the cash processing terminal has provided notification, transaction data that indicates at least a type of transaction, and device data that identifies at least a device that performed the transaction,
      a storage controller that associates the serial numbers, the recognition results, the transaction data, and the device data with each other and stores the serial numbers, the recognition results, the transaction data, and the device data in a storage section, and
      a comparison section that, in cases in which the serial numbers and banknote recognition results have been acquired from any cash processing terminal that is a part of the cash processing terminal cluster, compares the banknote recognition results against the stored recognition results associated with the serial numbers.

6. The data processing system of claim 5, wherein the display controller is further configured to control display of the serial numbers in cases in which a result of comparison by the comparison section indicates a disparity in the recognition results.

7. The data processing system of claim 5, wherein the data processing device further comprises:
   a serial number notification section that, in cases in which a result of comparison by the comparison section indicates a disparity in the recognition results, provides notification of the serial numbers to any cash processing terminal configuring the cash processing terminal cluster, or to a cash processing terminal in a local network that is different from the local network.

8. The data processing system of claim 5, wherein the recognition results include any of a denomination of the banknote, a banknote stacking sequence, or a number of banknotes by denomination.

* * * * *